United States Patent
Kressing et al.

(10) Patent No.: US 11,587,363 B2
(45) Date of Patent: Feb. 21, 2023

(54) SENSOR SYSTEM FOR CHECKING PALM VEIN PATTERNS

(71) Applicant: IRIS-GMBH INFRARED & INTELLIGENT SENSORS, Berlin (DE)

(72) Inventors: Christian Kressing, Hildesheim (DE); Tong Tang, Berlin (DE); Narges Baharestani, Berlin (DE); Thomas Trull, Berlin (DE)

(73) Assignee: IRIS-GMBH INFRARED & INTELLIGENT SENSORS, Berlin (DE)

( * ) Notice: Subject to any disclaimer, the term of this patent is extended or adjusted under 35 U.S.C. 154(b) by 141 days.

(21) Appl. No.: 17/116,614

(22) Filed: Dec. 9, 2020

(65) Prior Publication Data
US 2021/0174107 A1 Jun. 10, 2021

(30) Foreign Application Priority Data
Dec. 9, 2019 (DE) .......................... 102019133609.0

(51) Int. Cl.
*G06V 40/50* (2022.01)
*G06K 9/62* (2022.01)
(Continued)

(52) U.S. Cl.
CPC ........... *G06V 40/50* (2022.01); *G06K 9/6269* (2013.01); *G06V 10/143* (2022.01); *G06V 40/14* (2022.01)

(58) Field of Classification Search
None
See application file for complete search history.

(56) References Cited

U.S. PATENT DOCUMENTS

| 10,482,225 B1* | 11/2019 | Abdulhayoglu | G06F 21/31 |
| 2007/0075827 A1* | 4/2007 | Itoh | G06F 21/32 |
| | | | 340/5.83 |

(Continued)

FOREIGN PATENT DOCUMENTS

| DE | 102013208654 | 11/2014 |
| DE | 102017126207 | 5/2019 |

OTHER PUBLICATIONS

Bringer et al. "An Application of the Goldwasser-Micali Cryptosystem to Biometric Authentication," Information Security and Privacy, Jul. 2007, pp. 96-106.

(Continued)

*Primary Examiner* — Santiago Garcia
(74) *Attorney, Agent, or Firm* — Sheridan Ross P.C.

(57) ABSTRACT

The invention relates to a sensor system for checking a vein pattern. The sensor system comprises a first light source that is configured to emit during operation across the entire surface electromagnetic waves with wavelengths in the near infrared range, which are absorbed by hemoglobin. Furthermore, the sensor system comprises a second light source that is configured to emit during operation across the entire surface electromagnetic waves with wavelengths in the range of visible light. Furthermore, the sensor system comprises a camera with a first camera chip that is configured to record reflected electromagnetic waves with wavelengths in the near infrared range and to convert them into a corresponding infrared image, and with a second camera chip that is configured to record reflected electromagnetic waves with wavelengths in the range of visible light and to convert them into a corresponding photographic image. Finally, the sensor system comprises a first processor unit which is connected to the first camera chip and the second camera chip and which is configured to compare the photographic image with the infrared image, to determine the degree of matching (Continued)

between the photographic image and the infrared image and to classify the vein pattern as real if the degree of matching is less than a predetermined degree of matching, and to classify the vein pattern as not real if the degree of matching is greater than or equal to the predetermined degree of matching.

15 Claims, 4 Drawing Sheets

(51) Int. Cl.
*G06V 10/143* (2022.01)
*G06V 40/14* (2022.01)

(56) References Cited

U.S. PATENT DOCUMENTS

| | | | | |
|---|---|---|---|---|
| 2009/0123041 | A1* | 5/2009 | Tani | G06V 40/63 382/126 |
| 2010/0127827 | A1* | 5/2010 | Watanabe | G06V 40/23 340/5.83 |
| 2013/0170717 | A1* | 7/2013 | Yabuki | G07C 9/37 382/115 |
| 2013/0294658 | A1* | 11/2013 | Kamata | G06V 40/13 382/115 |
| 2013/0308834 | A1* | 11/2013 | Suzuki | G06V 40/1347 382/115 |
| 2015/0088755 | A1* | 3/2015 | Sobel | G06Q 20/20 705/71 |
| 2016/0098550 | A1* | 4/2016 | Lam | G06V 40/70 726/18 |
| 2017/0116602 | A1* | 4/2017 | Chauhan | G06Q 20/40145 |
| 2017/0262719 | A1* | 9/2017 | Yamazaki | G06F 21/35 |
| 2019/0385308 | A1* | 12/2019 | Kandlikar | A61B 5/4312 |
| 2021/0075619 | A1* | 3/2021 | Chereshnev | H04L 9/3239 |
| 2022/0038291 | A1* | 2/2022 | Hong | H04L 9/14 |

OTHER PUBLICATIONS

Hernandez-Garcia et al. "Individuals Identification Based on Palm Vein Matching under a Parallel Environment," Applied Sciences, Jul. 2019, vol. 9, No. 14, article 2805, 25 pages.
Sarier "A New Approach for Biometric Template Storage and Remote Authentication," Advances in Biometrics, ed. Tistarelli and Nixon, ICB 2009, vol. 5558, Jun. 2009, pp. 909-918.
Extended Search Report with machine translation for European Patent Application No. 20212911.0, dated Apr. 28, 2021, 12 pages.

* cited by examiner

SENSOR SYSTEM FOR CHECKING PALM VEIN PATTERNS

CROSS REFERENCE TO RELATED APPLICATIONS

This application claims the benefit of German Patent Application No. 102019133609.0 filed Dec. 9, 2019, the entire contents of which are incorporated herein by reference in its entirety.

The invention relates to a security system and a sensor system for checking a hand vein pattern and a method for checking a hand vein pattern. Sensors and systems for recording hand vein patterns, the signals of which are for example used for access control or identification, are already known from prior art. Such a sensor system is for example described in DE 10 2013 208 654.

The object of the present invention is to provide an improved security system, an improved sensor system and an improved method for recording and checking hand vein patterns, by means of which fakes can be detected.

In order to achieve this object, according to a first aspect of the invention, a security system with a sensor system, an authentication unit and two databases that are independent of each other is proposed, wherein, in the first database, a personal identity is linked to an identification code, and, in the second database, the identification code is linked to a vein pattern or feature vector generated from biometric data—in particular to a hash value derived therefrom. The authentication unit is configured to determine a vein pattern or feature vector—in particular a hash value derived therefrom—based on biometric data captured by the sensor system, and to access the second database on the basis of this vein pattern or feature vector, in particular a hash value derived therefrom, in order to retrieve and output an identification code assigned to the respective vein pattern or feature vector—in particular a hash value derived therefrom—from the second database.

In addition, the authentication unit may also be configured to access the first database on the basis of the retrieved identification code and to retrieve and output the personal identity assigned to the identification code from the first database.

The sensor system may be one of the type described below that is able to capture and evaluate both infrared images and photographic images of a vein pattern. However, the sensor system for the security system may also be one that is only able to capture infrared images of a vein pattern.

According to an inventive idea that can also be realized independently of the remainder of the security system, the object is achieved by means of a sensor system that comprises a first light source, a second light source, a camera with a first and, as the case may be, a second camera chip, as well as a first processor unit. The first light source is configured to illuminate the detection range of the camera across the entire surface and to emit during operation electromagnetic waves with wavelengths in the near infrared range which are absorbed by hemoglobin. The second light source is configured to also illuminate the detection range of the camera across the entire surface and to emit during operation electromagnetic waves with at least one other wavelength, in particular in the range of visible light. The camera comprises a first and a second camera chip or a single first, combined camera chip, of which the first camera chip is configured to record reflected electromagnetic waves with wavelengths in the near infrared range and to convert them into a corresponding infrared image, and of which the second camera chip is configured to record reflected electromagnetic waves of at least one other wavelength and convert them into a corresponding photographic image. In case of a single, combined camera chip, said chip comprises, on the one hand, first sensor cells for recording an infrared image and, on the other, second sensor cells for recording a photographic image. In addition, the second camera chip or the first camera chip may also comprise different second (and third) sensor cells which are sensitive to visible light and which are sensitive to different wavelength ranges of visible light, so that the second camera chip or the combined, first camera chip is able to provide different photographic images for different wavelength ranges of visible light. For purposes of the present disclosure, it is noted that the phrase "detection range" and "capture area" are equivalent.

In the context of this description, infrared image shall mean an image that is captured under infrared illumination and is represented by electrical signals of an infrared sensor, while photographic image shall mean an image that is captured under illumination with the at least one other wavelength—which is, in particular, in the range of visible light—and is represented by electrical signals of an image sensor that is sensitive to the other wavelength (or another wavelength range, preferably in the visible range of light). The first camera chip and the second camera chip may also be realized by a single, combined camera chip which has a light sensor matrix of alternating, differently sensitive sensor cells, namely, on the one hand, first sensor cells which are (only) sensitive to infrared light and provide an infrared image, and, on the other hand, such sensor cells that are (only) sensitive to visible light and provide a photographic image. Accordingly, the first and the second camera chip may be part of a single, combined camera chip.

Preferably, the second camera chip comprises different second sensor cells, that are sensitive to different wavelength ranges of visible light, so that the second camera chip is able to provide different photographic images for the different wavelength ranges of visible light.

The first processor unit is connected to the first and the second camera chip or to the single, combined camera chip, and configured to compare the photographic image with the infrared image, to determine the degree of matching between the photographic image and the infrared image and to classify the vein pattern as real if the degree of matching is less than a predetermined degree of matching, and to classify the vein pattern as not real if the degree of matching is greater than or equal to the predetermined degree of matching. The vein pattern is preferably a hand vein pattern.

The camera and the light sources can preferably be triggered in a controlled manner in such a way that they make gated imaging possible. To this end, the light sources are preferably configured such that they emit light pulses in the respective wavelength range which are limited in time, and the corresponding camera chip and, in particular, the corresponding sensor cells are read with a delay after the emission of a light pulse, so that light reflected at a very short distance will not be captured by the sensor cells and thus be gated out. Thus, the camera chip and its sensor cells only capture light that is reflected by structures that are at a predetermined minimum distance from the camera. This prevents stray light from structures that are not of interest from being gated out and from being able to over-illuminate the image of interest. The latter is a problem because light reflected at a short distance has a higher intensity than light reflected at a comparatively greater distance.

For the specific application of hand vein pattern recognition, the time delay for gated imaging is preferably set in such a way that light reflected by the surface of the hand is not captured, but only the light reflected by structures below the surface of the hand, since it is the latter structures that are the ones of interest in this case. This is based on the knowledge that the time-delayed triggering of the IR sensor makes it possible to (temporarily) gate out the reflected light on the surface of the hand. The light reflected on the surface of the hand is interference light and may blind the camera sensor. The suppression of this interference light leads to a significantly improved contrast. The information that a vein image that is subsequently provided was recorded from a different depth can be used as an additional test criterion, in addition to the spectral fake detection, since, in that case, a hand vein pattern artificially applied to the surface of the hand would no longer fall within the detection range of the first camera chip. For purposes of the present disclosure, it is noted that the phrase "detection range" and "capture area" are equivalent.

According to a second aspect, the invention relates to a method of checking a vein pattern. The method comprises the following steps:
  irradiating the entire hand surface or a partial area of the hand with electromagnetic waves with wavelengths in the near infrared range which are absorbed by hemoglobin,
  recording an image of reflected electromagnetic waves with wavelengths in the near infrared range and outputting infrared image signals representing a corresponding infrared image,
  irradiating the entire hand surface or a partial area of the hand with electromagnetic waves with at least one other wavelength, in particular in the range of visible light,
  recording an image of reflected electromagnetic waves with the at least one other wavelength, and outputting photographic image signals representing a corresponding photographic image,
  comparing the photographic image with the infrared image,
  determining a degree of matching between the photographic image and the infrared image, and
  classifying the hand vein pattern as real if the degree of matching is less than a predetermined degree of matching and as not real if the degree of matching is greater than the predetermined degree of matching.

The invention incorporates the following findings: near infrared light can penetrate the skin and is proportionally reflected by body tissue lying beneath the skin. Hemoglobin in the veins absorbs most of the infrared light, so that only a small amount of infrared light is reflected by the blood in the veins and the veins thus appear dark in the infrared image. In an infrared light image recording, the vein pattern consequently leads to a light-dark contrast. The vein pattern is therefore visible in the infrared image. Since only part of the infrared light penetrates the skin, infrared light is also reflected by the surface of the hand. If a vein pattern is painted on the surface of the hand, for example with a dark color, the dark color also absorbs part of the infrared light when an image is recorded with infrared light. Thus, the vein pattern that has been painted on also leads to a light-dark contrast in the infrared image. Sensor systems and methods for vein pattern recognition known from prior art are not able to use the infrared images recorded by them to determine with certainty whether the respective infrared image shows a real or a painted on vein pattern. The invention incorporates the finding that fakes such as painted on vein patterns can be reliably detected by means of a photographic image recorded for example under visible light and a comparison between the infrared image and the photographic image.

If a second picture is recorded under illumination with a non-infrared light source for, in particular, visible light, especially in the shorter visible wavelength range, this light is not able to penetrate into deeper layers of the skin and underneath the skin. Visible light, in particular, is mostly reflected on the surface of the skin. A vein pattern painted on with dark color also absorbs the visible light, so that a painted on vein pattern leads to a light-dark contrast, even in a photographic image, while the actual veins do precisely not cause a light-dark contrast in the photographic image.

If a vein pattern is recognizable both in the image recorded with the near infrared light, the infrared image, and in the image recorded with the visible light, the photographic image, the vein pattern is fake.

The invention also incorporates the finding that a comparison of the images recorded in particular in the visible range and in the near infrared range makes it also possible to detect differences or to detect the absence of such differences that are due to the surface structures and material properties. Thus, in case of a real hand surface, the differences between the infrared image and the photographic image will be different from the ones present in case of fake surfaces, such as: paper (printed vein patterns), plastic covers (e.g., rubber gloves), plastic hands and other imitations. As a general rule, the reflection properties of the materials differ in different electromagnetic wavelength ranges. The image signals make it possible to recognize and evaluate these differences.

With the help of the invention, it is therefore possible to check whether a vein pattern is a real vein pattern or a fake, since a vein pattern will only be classified—or, in other words, identified—as real, if the comparison between the infrared image and the photographic image results in a degree of matching that is less than a predetermined degree of matching.

Thus, the invention allows for a—with regard to security—improved recognition of vein patterns and the rejection of fakes, and therefore for an increased security for access controls that are based on the recognition of vein patterns. Furthermore, the invention incorporates the finding that hemoglobin only absorbs electromagnetic waves with wavelengths in the range of near infrared light, but not visible light, and that a real vein pattern can therefore only be recognized by an appropriate camera if it is illuminated with near infrared light, but not if it is illuminated with visible light. In the context of the present invention, light in the near infrared range means light with wavelengths in the range from 780-1100 nm.

Exemplary embodiments of the sensor system according to the invention and the method according to the invention are described below. The additional features of the exemplary embodiments can be combined with one another to form further embodiments, unless the description expressly describes them as alternatives to each other.

In one embodiment, the degree of matching is determined statistically by means of the population of the photographic image data and the infrared image data in the system. The degree of matching can be represented by a multidimensional vector which indicates a degree of similarity. In the alternative, the degree of matching can also be determined by means of an evaluation of the infrared image and the photographic image, in the context of which deviations in predefined areas are identified and added up to a level of matching in accordance with a point system.

In one embodiment, the predetermined degree of matching includes a lower predetermined degree of matching and an upper predetermined degree of matching that is greater than the lower predetermined degree of matching. The hand vein pattern will be classified as real, if the degree of matching is less than the lower predetermined degree of matching, and as not real, if the degree of matching is greater than the upper predetermined degree of matching. This embodiment allows for a better check as to whether a vein pattern is a real vein pattern or fake, since a vein pattern will only be classified as real if the comparison between the infrared image and the photographic image leads to a level of matching that sufficiently indicates one of the two classifications. In a further development of this embodiment, a warning signal or a request to present the hand again will be output to a user, if the degree of matching is between the lower predetermined degree of matching and the upper predetermined degree of matching.

In order to be able to compare the infrared image and the photographic image, the first processor unit is preferably configured to execute a differential image method or a comparison between the information content of the infrared image and the information content of the photographic image, or a comparison based on selected points. In one embodiment, the first processor unit is configured to determine the degree of matching by means of a threshold value analysis.

Furthermore, it is advantageous if the first light source is configured to emit electromagnetic waves with a wavelength between 820 nm and 900 nm, e.g., of 850 nm. At this wavelength, the absorption of the electromagnetic waves by the hemoglobin is particularly strong, so that vein patterns can be recognized particularly well. Furthermore, it is advantageous if the second light source is configured to emit electromagnetic waves with a wavelength between 450 nm and 500 nm, e.g., of 470 nm.

In one embodiment of the sensor system, the first and the second light source are configured as a single broadband light source. In this case, two filters, namely a first and a second filter, may be provided, of which the first filter is configured to only let through electromagnetic waves with wavelengths in the near infrared range, and the second filter is configured to only let through electromagnetic waves with the at least one other wavelength, in particular in the range of visible light. The first and the second filter can either be switched alternately in front of the broadband light source or be part of the camera. In this case, the camera chip can be a single, broadband sensitive camera chip and the respective infrared image and the associated photographic image can be generated through the switching of the corresponding filters. In this case, the first and second sensor cells may also be broadband sensitive and identical. The first camera chip is in this case a broadband sensitive camera chip with an upstream infrared filter (i.e., an infrared-permeable filter that blocks visible light) and the second camera chip is a broadband sensitive camera chip with an upstream infrared blocking filter that blocks infrared light and is transparent for visible light.

This embodiment makes it possible to make changes in the illumination scenarios between defined wavelengths by changing filters in order to adapt illumination scenarios to the particular circumstances in which the sensor system is used. In addition, the use of filters with a broadband light source instead of light sources with narrowly defined emission characteristics is often cheaper and, if only one light source is used, the sensor system can have a significantly more compact design.

Advantageously, the first and second camera chips are configured together as a combined camera chip, i.e., both functions are integrated on a combined camera chip. Thus, a more compact system can be built. The combined camera chip may, in particular, be a single camera chip sensitive to both visible and infrared light.

In an advantageous embodiment, the first and second light sources configured to alternately emit electromagnetic waves in a direct sequence from image to image or partial images, so that in each case an infrared image (first light source) and a normal image (second light source) are taken immediately one after the other. The first and/or second or the combined camera chip is in particular a semiconductor camera chip.

The sensor system preferably includes an optical double band pass filter in front of the first and second or combined camera chip, which is transparent only for the wavelength ranges of the light emitted by the first and second light sources and which gates out all other wavelengths, in particular interfering background light such as solar radiation. The wavelengths of the first and second light sources may also include narrow wavelength ranges.

In one embodiment, the processor unit is additionally configured to cause a warning signal to be output when the hand vein pattern is classified as not real. This warning signal may, for example, be output in the form of an acoustic signal, which may, as the case may be, indicate an undesired access attempt to security personnel present. However, in one embodiment, the warning signal can also be output in the form of a signal to electronic security systems which will, for example, prevent further access to a downstream system to be protected for a predetermined period of time or initially block the sensor system for a predetermined period of time.

In a preferred embodiment, a release unit connected to the sensor system is provided, which is configured to initiate a further classification process or to enable access to a downstream system when the vein pattern is classified as real. In this embodiment, the classification of the vein pattern as real is used as an access barrier either for a further check of the real vein pattern or as a sole access barrier in systems which serve the purpose of granting, as a general rule, access only to humans.

Preferably, the first processor unit is, in addition, configured to carry out the further classification process, which includes image preprocessing of the infrared image, feature extraction and a classification algorithm that classifies the vein pattern as sufficiently matching or not sufficiently matching.

Preferably, the first processor unit is configured to calculate a distance from the reflected light pulses in a sleep mode of the sensor system in which only the second light source emits light pulses at regular time intervals, and to start irradiation with the first light source if said distance is smaller than a predetermined minimum distance. This allows for an efficient operation of the sensor system, since the irradiation with the first light source and the subsequent generation and evaluation of the photographic images are only carried out when an object is located in the irradiated area.

In a preferred embodiment, the first processor unit is additionally configured to compare the infrared image with at least one stored vein pattern or a stored feature vector corresponding to the vein pattern when the vein pattern is classified as real, and to classify the real vein pattern, depending on a degree of pattern matching, as sufficiently matching or not sufficiently matching. In this case, the release unit is additionally configured to enable access to a downstream system when a vein pattern is classified as sufficiently matching. This embodiment allows for a twofold access control since a vein pattern must first of all be classified as real and, in the subsequent step, also as sufficiently matching, in order to then enable, as the case may be, access to downstream systems.

In a preferred embodiment, the sensor system comprises an additional topography sensor for capturing three-dimensional topographies and a second processor unit connected to the first processor unit and the topography sensor, which is configured to generate during operation a standardized vein pattern of a hand or a feature vector corresponding to the vein pattern from the infrared image of the camera obtained by means of the illumination with the first light source and the three-dimensional topography data of the topography sensor. In the processor unit, the topography data and the vein pattern are linked in such a way that a standardized vein pattern as well as a standardized hand geometry image, i.e., a standardized topography of the hand, can be calculated. What is performed is therefore a position standardization in space. Both hand geometry and vein branching, i.e., the vein pattern, are spatial structures whose 2D images on a camera chip depend on their spatial position (twisting, tilting, curvature etc.). A detection system based on this embodiment of the sensor system is tolerant of the hand position (position and orientation of the hand and the individual fingers) and does not require any mechanical support for the hand in order to ensure "correct" positioning of the hand.

In a preferred embodiment, the release unit is configured to start the topography sensor when a real vein pattern is present. This provides an efficient system since, on the one hand, topography data will only be captured and, thus, a second security check only be started, if it is ensured that the vein pattern is a real vein pattern and not a fake, and since, on the other hand, the topography sensor does not need to be constantly kept in operation, as long as no vein pattern has been recognized as real.

Advantageously, the first processor unit is additionally configured to compare the standardized vein pattern generated by the second processor unit or the generated feature vector with at least one stored vein pattern or with at least one stored feature vector, and to classify the generated standardized vein pattern or the generated feature vector as sufficiently matching or not sufficiently matching. Furthermore, it is advantageous if this release unit is additionally configured to enable access to a downstream system when a vein pattern or a feature vector is classified as sufficiently matching. This allows for a particularly reliable checking of hand vein patterns, since, first of all, the authorization is checked in two steps, namely, first by means of the verification of the realness of the vein pattern and subsequently in a verification of the sufficient matching with a stored vein pattern, and, at the same time, the device does not require specifications for how to insert the hand, i.e. it is more tolerant of the hand position.

In a further embodiment, the second processor unit is additionally configured to use the topography data and the infrared images to determine whether the vein pattern is a vein pattern of a wrist, palm or back of the hand and to output this information to the first processor unit. With such an embodiment, the system is able to achieve even greater independence from the position of the hand during the check, since the system is able to independently determine whether the real vein pattern is to be compared with stored vein patterns from the wrist, the palm or the back of the hand. This allows, on the one hand, the installation of an additional security mechanism requiring for access to the downstream system that two vein patterns classified with sufficient certainty must be present, i.e., for example one pattern of the palm and one of the back of the hand. On the other hand, however, systems that only require one sufficiently matching vein pattern can be configured to be even more tolerant of the hand position if the vein patterns of the wrist, the palm or the back of the hand are available for everyone authorized for access, so that, for example, a verification can also be performed if the palm or only the wrist is facing the sensor, but not the back of the hand.

In an alternative embodiment, the topography sensor is a time-of-flight sensor (TOF sensor). Said TOF sensor determines the distance of an object from the sensor for each image point by recording the time of flight of an infrared light pulse and calculating the distance based on the speed of the light. Furthermore, it is advantageous if the first processor unit is a host processor, in particular an RFID (radio frequency identification) host processor, and if the comparison is made based on a vein pattern or feature vector stored in an RFID slave processor. In this case, a classification will only be possible if a connection channel has been established between the RFID host processor and an RFID slave processor. This allows for an identification that does not require the storage of data in a database system and thus greater security, since both the valid vein pattern and the RFID slave processor must be available at the sensor system for identification.

Alternatively, another connection processor that realizes at least one active radio connection—preferably in accordance with the known standards WLAN, Bluetooth, ZigBee or NFC—may be used instead of the RFID host processor. In this case, the slave processor is also equipped with at least the same active radio connection capability as the host processor. The comparison is, just as described with regard to RFID, also made based on a vein pattern or feature vector stored in the slave processor.

However, the comparison with vein patterns or feature vectors that are stored in a database is also advantageous. In this case, it is not necessary for every user to receive an additional identification element, but the user may perform the classification based on the pattern that is already available.

In one embodiment of the invention, the sensor system is arranged above a keyboard. In this case, a vein pattern in the back of the hand is detected. This allows for an easy identification during an input process. In this case, the first processor unit of the sensor system may be configured and connected to the keyboard in such a way that every time a key is struck, a verification process of the vein pattern can be initiated at the same time, i.e., the illumination with the first light source can be started. The entry of this character or a group of characters will only be recognized as valid if a vein pattern classified as real is detected. If it is also to be ensured that only certain users have access, the input will only be recognized as valid if the vein pattern has also been classified as sufficiently matching.

The advantage of such an arrangement is that a permanent authentication of the user during a communication process, for example with a computer, can be ensured and that it can thus be permanently ensured that only authorized users can access the computer or the system connected to it.

However, it can also be advantageous if the sensor system is integrated in a keyboard and uses the vein pattern of the palm for identification. In this case, the keyboard is configured such that the heels of the hand always hover over the part of the keyboard that faces the user or may also rest on it, while the fingers are able to reach the keys. Thus, a narrow arrangement of the keys is deliberately chosen. Number keys or other function keys are positioned either to the right or to the left of the letter keys. In the part of the keyboard facing the user, an embodiment of the sensor system according to the invention is respectively integrated for each, the left and the right hand. Depending on the security requirements, access to a downstream system can be unblocked if a real and sufficiently matching vein pattern is detected for only one hand or for both hands. The sensor system is preferably configured in such a way that it can detect the vein structure at a very short distance from the palm or the wrist; it is capable of capturing the palm with an extension of up to 120 mm, at a distance of 5 mm to 20 mm from the sensor surface.

In one exemplary embodiment, the sensor system comprises a plurality of first light sources which are embedded in the computer keyboard in such a way that each first light source illuminates a section of the palm or the wrist, respectively covering the entire surface. In another exemplary embodiment, the sensor system comprises a plurality of second light sources for visible light which are also embedded in the keyboard in such a way that each second light source illuminates a section of the palm or the wrist, respectively covering the entire surface. In addition, this embodiment comprises a plurality of first and second camera chips for recording and converting the respective sections of the hand vein pattern. In this case, the arrangement of the camera chips and the light sources is chosen such that the combination of all photographic images and/or infrared images of the camera chips creates a mostly complete picture of the palm or wrist. This complete image can then be fed to a processing process for determining the vein pattern template in its entirety. The arrangement of a plurality of camera chips results from the need for a very short image distance. If only one first and one second camera chip is used, the palm might not be able to be optically completely recorded, so that no complete image of the vein pattern can be provided for processing.

In one embodiment of the method, a warning signal is output if the vein pattern is classified as not real. This makes the initiation of additional security measures due to the detection of an unwanted access attempt possible.

Furthermore, it is advantageous if, after a vein pattern has been classified as real, further processes are enabled. In this case, it is particularly preferred if the further processes comprise the following steps:
recording the topography data of the hand, and
generating a standardized vein pattern of the hand or a feature vector corresponding to the vein pattern from the infrared images and the topography data.

The generation may be executed by means of the calculation of the corresponding patterns or feature vectors.

Preferably, this step is followed by a comparison of the generated standardized vein pattern or the generated feature vector with at least one stored vein pattern or feature vector, and a classification of the generated vein pattern or the generated feature vector as sufficiently matching or not sufficiently matching with the stored vein pattern or feature vector. In one embodiment of the method, additional processes are unblocked once a vein pattern or a feature vector has been classified as sufficiently matching. Thus, a multi-level access control method can be realized.

Figure 1:
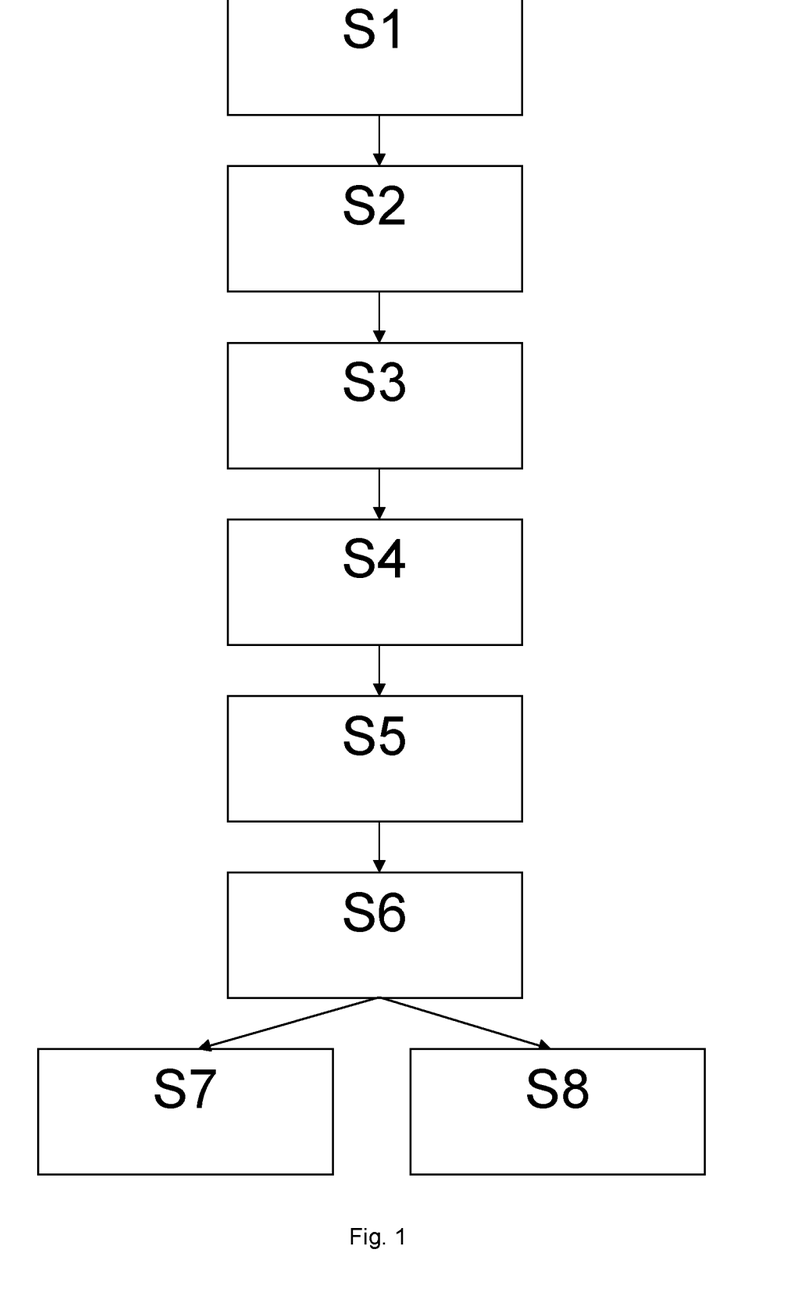

Further embodiments of the method according to the invention and the device according to the invention are explained below with reference to the figures. The following is shown in FIG. 1 a flow chart for an embodiment of the method according to the invention;

FIG. 1 shows a flow chart of a method for checking hand vein patterns. In step S1, a hand or an object placed in the beam path is irradiated with a first light source that emits electromagnetic waves with wavelengths in the near infrared range, preferably between 780 nm and 1,100 nm, which are absorbed by hemoglobin across the entire surface.

In step S2, reflected electromagnetic waves with wavelengths in the near infrared range are recorded and converted into a corresponding infrared image. The recording and conversion are carried out by means of a first camera chip.

In step S3, the hand or the object is irradiated across its entire surface with a second light source that emits electromagnetic waves with wavelengths in the range of visible light, and, in step S4, reflected electromagnetic waves with wavelengths in the range of visible light are recorded and converted into a corresponding photographic image.

In a preferred embodiment, step S3 takes place immediately after step S1, so that a direct sequence from image to image or partial images is obtained and the hand or the object is in the same position during both irradiations. In step S5, the infrared image and the photographic image are compared and a degree of matching between the photographic image and the infrared image is determined. The comparison may, for example, be performed by means of differential image methods or by means of a comparison of the information content of the infrared image with that of the photographic image or by means of a comparison on the basis of selected points. In step S6, a vein pattern is classified as real if the degree of matching is less than a predetermined degree of matching and as not real if the degree of matching is greater than or equal to the predetermined degree of matching. In this embodiment, the degree of matching can be represented by a multidimensional vector which indicates a degree of similarity. The classification ensures that the irradiated object is a real hand and not, for example, a fake where a vein pattern is only printed on or otherwise applied. Optionally, another process, for example additional access controls where the real vein pattern is compared with stored vein patterns, and where, subsequently, a final release and/or the issuance of an access authorization will be carried out, may be added in step S7, after the vein pattern has been classified as real.

If the photographic image and the infrared image match to too great an extent—that is, if the vein pattern is not classified as real—a warning signal can be output in step S8. This warning signal may, for example, be output as an acoustic warning signal to security personnel in the vicinity of the sensor system or of an access control system in which the sensor system is integrated, so that the unauthorized access attempt is reported. However, alternatively or additionally, the warning signal may also be configured such that it is output to additional security systems, which will in response electronically block access devices for certain periods of time or also block access to the sensor system for a predetermined period of time.

The following steps, which are not illustrated, are suitable as steps for further access control: recording of topography data of the hand after the vein pattern has been classified as real and calculation or generation of a standardized vein pattern of the hand or of a feature vector corresponding to the vein pattern from the infrared image and the topography data as well as a subsequent comparison of the generated standardized vein pattern or the generated feature vector with at least one stored one vein pattern or feature vector, and classification of the generated vein pattern or of the generated feature vector as sufficiently matching or as not sufficiently matching, depending on the actual degree of matching. After the vein pattern or the feature vector has been identified as sufficiently matching, further additional processes, such as access to an electronic system, may be unblocked.

Figure 2:
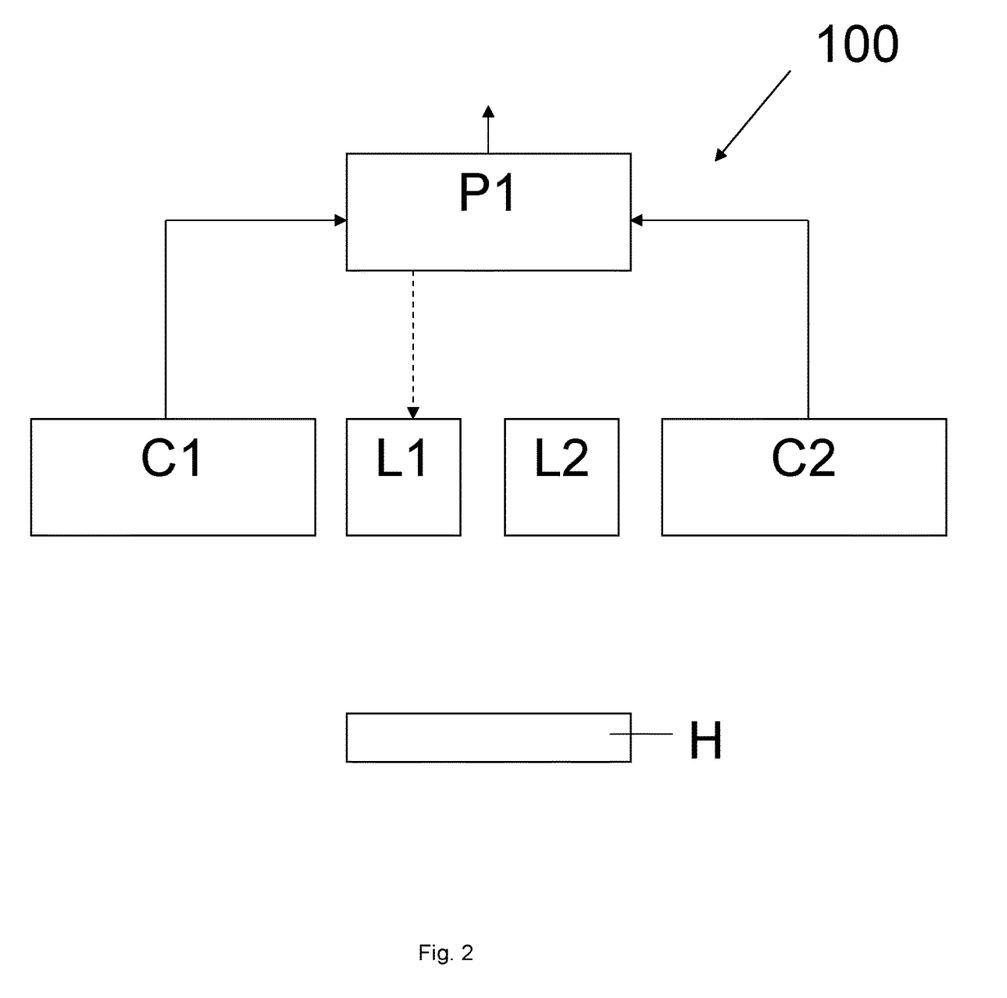
FIG. 2 a schematic illustration of an embodiment of a sensor system according to the invention for checking a hand vein pattern.

FIG. 2 shows a schematic illustration of an embodiment of a sensor system for checking hand vein patterns according to the invention. The sensor system comprises a first light source L1, a second light source L2, a camera with a first camera chip C1 and a second camera chip C2 and a processor unit P1. In this case, the first light source L1 of the sensor system 100 is configured to illuminate the entire detection range of the sensor system with electromagnetic waves with wavelengths in the near infrared range which are absorbed by hemoglobin. The second light source L2 is configured to illuminate during operation the entire detection range of the sensor system with electromagnetic waves with wavelengths in the range of visible light, i.e., with visible light. For purposes of the present disclosure, it is noted that the phrase "detection range" and "capture area" are equivalent.

The camera has a first camera chip C1 with a first light sensor matrix and a second camera chip C2 with a second light sensor matrix as well as one or more lenses for projecting one photographic image, respectively, onto each of the light sensor matrices. The first camera chip C1 comprises a matrix sensor that is sensitive to electromagnetic waves with wavelengths in the near infrared range for recording a corresponding infrared image and for outputting infrared light image signals. The second camera chip C2 comprises a matrix sensor that is sensitive to electromagnetic waves with one or different wavelengths in the range of visible light for recording a corresponding photographic image under visible light and for outputting photographic image signals.

It is also possible that, instead of two camera chips, a single combined camera chip with a light sensor matrix that is sensitive both to infrared light and to one or different wavelengths in the visible wavelength range of light is provided. Such a camera chip may, for example, have alternating, differently sensitive sensor cells in the light sensor matrix, namely, on the one hand, those that are (only) sensitive to visible light and, on the other, those that are (only) sensitive to infrared light. It is, in particular, possible that differently sensitive sensor cells may be provided for different wavelength ranges in the visible wavelength spectrum of light, as is known, for example, from camera chips for color digital cameras, so that the single combined camera chip is also able to provide different photographic images for different wavelength ranges of visible light. Alternatively, a single light sensor matrix with broadband—i.e., sensitive to both visible and infrared light—sensor cells may be provided. In this case, infrared light images can be recorded under infrared light and photographic images under visible light as the light sources L1 and L2 are alternately switched on and off accordingly.

It also applies to the light sources L1 and L2 that, instead of two separate light sources, a single broadband light source that illuminates the detection range of the sensor system simultaneously both with visible and infrared light may be provided. In this case, the two different images, namely the infrared image and the photographic image recorded under visible light, can be obtained by the two differently sensitive camera chips C1 and C2 or the differently sensitive sensor cells of the one camera chip. For purposes of the present disclosure, it is noted that the phrase "detection range" and "capture area" are equivalent.

Preferably, the light sources are designed to emit light pulses for a limited period of time, and the first and second camera chips or the single combined camera chip are preferably synchronized with the respective light source in such a way that their sensor cells only capture incident light with a predetermined delay time in order to gate out scattered light (gated imaging). Specifically, this means that the electrical charges generated by incident protons at the respective sensor cell are only collected and thus integrated after the specified delay time after the emission of the corresponding light pulse, so that, as a result, only parts of the light pulse reflected by structures that are located more than a minimum distance away are captured.

The processor unit P1 is connected to the first and the second camera chips (or to the single camera chip), and configured to compare a photographic image represented by photographic image signals with an associated infrared image represented by infrared light image signals, to determine a degree of matching between the photographic image and the infrared image and to classify the vein pattern as real if the degree of matching is less than a predetermined degree of matching, and to classify the vein pattern as not real if the degree of matching is greater than or equal to the predetermined degree of matching. The processor unit P1 thus realizes an image comparison unit.

With the help of this sensor system, it is possible to identify an object H located in the detection range of the sensor system as a hand with a real vein pattern or as fake, and thus to prevent the option to use a fake to access the downstream systems. For purposes of the present disclosure, it is noted that the phrase "detection range" and "capture area" are equivalent.

In one embodiment, the processor unit P1 is further configured to cause a warning signal to be output when a hand vein pattern is classified as not real. In a further embodiment, a release unit, which is not shown in this figure, is connected to the sensor system and is configured to allow access to a downstream system, for example a security system with an authentication unit, if the vein pattern is classified as real.

Figure 3:
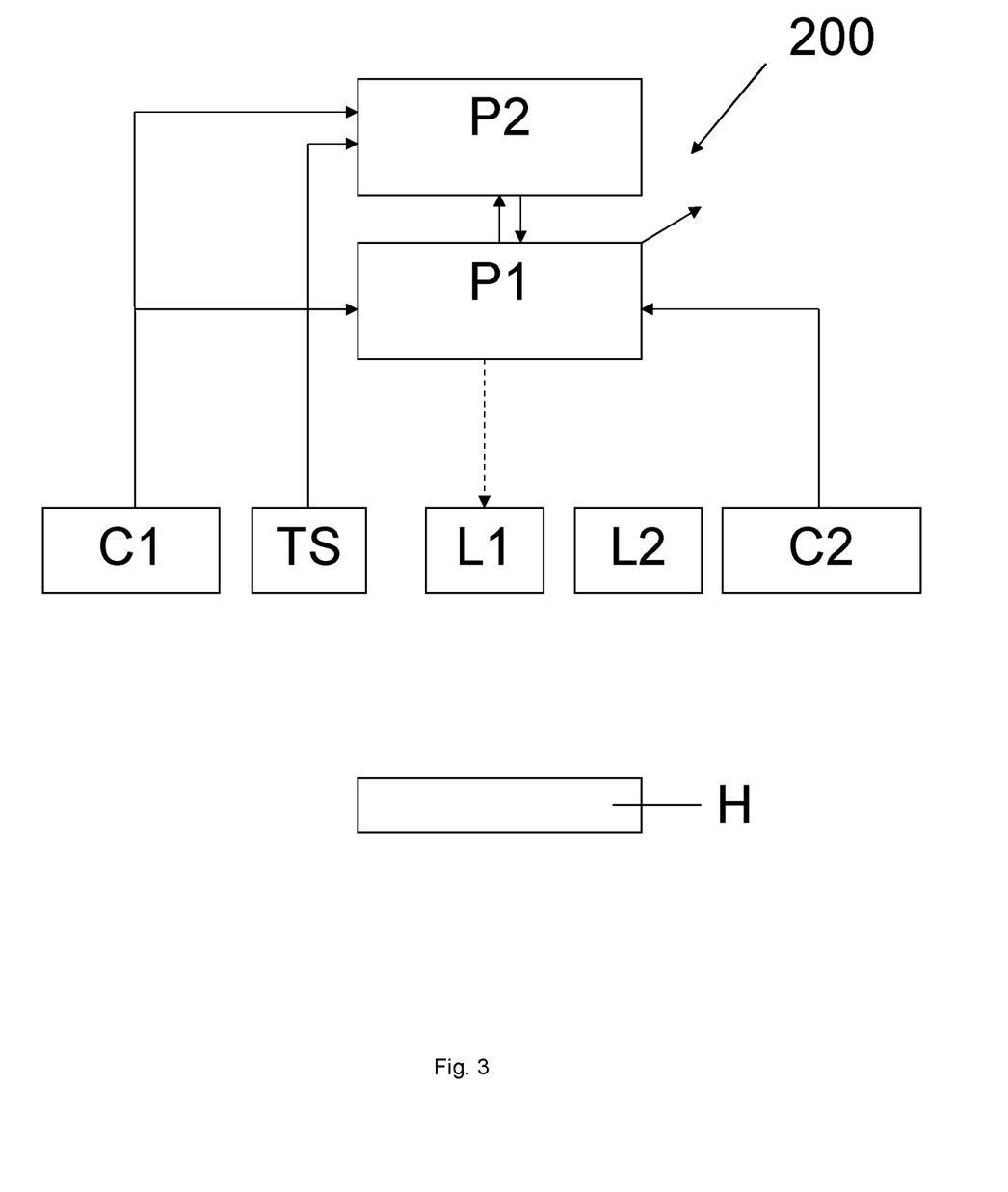
FIG. 3 a schematic illustration of another embodiment of a sensor system according to the invention.

FIG. 3 shows a schematic illustration of another embodiment of a sensor system according to the invention. The basic structure of the sensor system in FIG. 3 is similar to the system shown in FIG. 2, which is why mainly the differences will be described in more detail below. The sensor system 200 shown in FIG. 3 additionally comprises a topography sensor TS for capturing three-dimensional topographies and a pattern processing unit P2, that is connected to the first processor unit P1 and the topography sensor TS. The topography sensor TS may, for example, be a 3D camera that works on the basis of the time-of-flight (TOF) principle and uses the time of flight of light pulses reflected by different points on the surface of an object to determine a distance of the different points on the surface of the object from the camera, and to generate and output corresponding topography data that represents a three-dimensional topography.

The 3D camera working on the basis of the time-of-flight (TOF) principle may also have a camera chip with a light sensor matrix that comprises alternating, differently sensitive sensor cells, namely, on the one hand, those that are (only) sensitive to visible light and, on the other, those that are (only) sensitive to infrared light. The same camera chip can also be used to capture 3D images in accordance with the time-of-flight principle, so that the 3D camera acts as both a topography sensor as well as an infrared image camera and a camera for visible light, and the system only requires a single camera.

When it comes to recording the infrared images and the photographic images, the camera works preferably as a gated imaging camera, in which the sensor cells of the camera chip are synchronized with an emission of light pulses by the light sources in such a way that the sensor cells only capture reflected light after a predetermined delay after the emission of a corresponding light pulse. Thus, light pulses reflected from a very short distance from the camera are not captured. The delay is specified in such a way that only light that is reflected from structures that are far enough away from the camera will be captured. The delay is set in such a way that light reflected by structures of interest will be captured, while light which is reflected by structures "in front of" the structures of interest will not be captured. Structures "in front of" the structures of interest are structures that are closer to the camera than the structures of interest.

In the exemplary embodiment shown in FIG. 3, the topography sensor TS may, in particular, be configured in such a way that it accesses, on the one hand, the first light source L1—which emits infrared light—in order to initiate infrared light pulses, and, on the other hand, the camera chip C1—that is sensitive to infrared light or sensor cells of a single camera chip—that are sensitive to infrared light—in order to capture the reflected infrared light pulses and to determine the time of flight of those infrared light pulses between the initiation of an infrared light pulse and the capturing of the corresponding reflected infrared light pulse by the individual sensor cells.

The pattern processing unit P2 is configured to generate a standardized vein pattern of a hand or a feature vector corresponding to the vein pattern from the infrared image recorded by means of the camera chip C1 under illumination from the first light source L1 and the topography data obtained by means of the topography sensor and representing a three-dimensional topography. Preferably, the sensor system 200 is configured in such a way that only those vein patterns are fed to the pattern processing unit P2 for further processing which were previously recognized as real vein patterns in the context of the comparison of the infrared image and the photographic image. As explained above, this will be the case if the infrared image and the photographic image are sufficiently different, i.e., if, for example, no photo of a vein pattern was used in order to deceive the sensor system.

In one embodiment, the sensor system 200 has, in addition, a release unit which is, on the one hand, designed to start the topography sensor in case of a sufficiently low degree of matching between the photographic image and the infrared image, i.e., when a vein pattern is classified as real, and which, on the other hand, is also designed to subsequently allow a vein pattern or feature vector that has subsequently been classified as sufficiently matching access to a downstream system. The release unit is not shown in FIG. 3.

In one embodiment, the first processor unit P1 is furthermore configured to calculate a distance from the reflected light pulses in a sleep mode of the sensor system in which only the second light source emits light pulses at regular intervals, and to start irradiation with the first light source if said distance is smaller than a predetermined minimum distance. The embodiment of the sensor system 200 is particularly advantageous for checking vein patterns if the area in which the hand to be recognized is positioned is to be as free as possible, i.e., if there are no limitations for the position of the hand. Due to the standardization of the vein pattern by means of the topography sensor, the system is tolerant of the position of the hand. It is, in particular, possible to realize systems that are suitable both for vein patterns in the wrist and for the palm as well as the back of the hand.

The pattern processing unit P2 is preferably configured to determine a standardized vein pattern from a recorded vein pattern independently of the hand posture during the recording of the vein pattern, i.e., a vein pattern that results and/or would result from a certain, predetermined hand posture (e.g., with the fingers stretched out and resting against each other). As part of the standardization of the hand vein pattern, the vein pattern of a hand that is curved during recording is, for example, transformed in such a way that it corresponds to the vein pattern of the hand with outstretched fingers, if it is specified for the standardization that the hand with outstretched fingers is to be used as the standard posture. The pattern processing unit P2 may be part of the processor unit P1.

A sensor system of the type presented herein, i.e., for example the sensor system 100 or, in particular, the sensor system 200, may be part of a security system.

In a simple case, the first processor unit P1 is preferably also configured to compare a vein pattern identified as real or a (standardized) vein pattern generated or calculated by the pattern evaluation unit or a generated or calculated feature vector with at least one stored vein pattern or at least one stored feature vector, and to classify the generated standardized vein pattern or the generated feature vector as sufficiently matching or not sufficiently matching.

Figure 4:
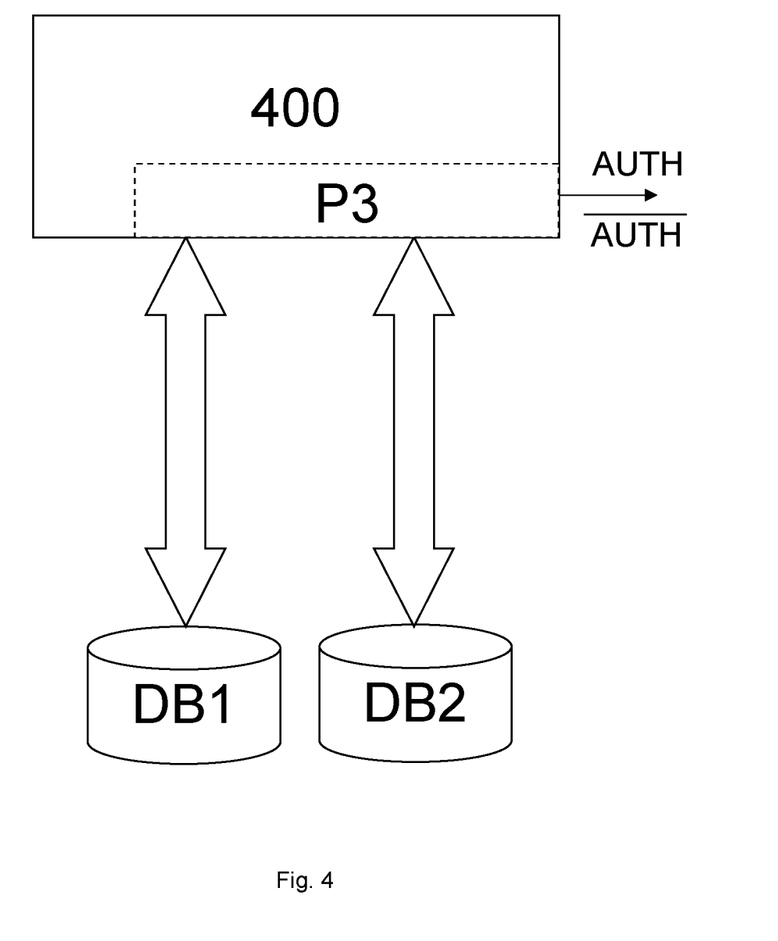
FIG. 4 a security system.

A security system that, in addition to a sensor system 400, comprises an authentication unit P3 and two databases DB1 and DB2 is preferred; see FIG. 4. The sensor system 400 may, for example, be a sensor system such as the sensor system 100 or 200 from FIG. 2 or 3.

However, alternatively, the sensor system may also only have an infrared-sensitive camera chip and no camera chip that is sensitive to visible light. In this case, the security system according to FIG. 4 will not be able to identify a fake vein pattern in the form of a photo as fake. However, the system will still have the advantages with regard to the strict separation of data achieved through the use of two independent databases.

The first database DB1 contains at least one data structure, for example an assignment table or look-up table (LUT), in which identification codes are assigned to individual persons or objects.

The second database DB2 contains at least one data structure, for example an assignment table or look-up table (LUT), in which the identification codes are assigned at least one characteristic pattern (for example a vein pattern, in particular a standardized vein pattern) or a feature vector.

To authenticate a person, a graphical representation of the person's identification code assigned to the person is recorded together with the vein pattern of the person's hand, preferably by the second camera chip C2, which is sensitive to visible light, but alternatively, additionally or exclusively also by an infrared-sensitive camera chip.

The graphical representation of the identification code may, for example, be a QR code, but also a bar code or a printed digit code.

The linking of the identification code and the hand vein pattern means that, even in a database-based system, it will not be necessary to directly link the identity of a person to a biometric vector (hash value or similar).

Instead, two entirely separate databases DB1 and DB2 are used. In the first database DB1, the personal identity is linked to the identification code, and, in the second database DB2, which is independent of the first database DB1, the identification code is linked to the hand vein pattern or feature vector generated from the biometric data—in particular with a hash value derived therefrom.

The authentication unit P3 is configured to determine a vein pattern or feature vector—in particular a hash value derived therefrom—based on biometric data captured by the sensor system 400, and to access the second database DB2 on the basis of this vein pattern or feature vector—in particular a hash value derived therefrom—in order to retrieve and output an identification code assigned to the respective vein pattern or feature vector—in particular a hash value derived therefrom. In addition, the authentication unit P3 may also be configured to access the first database DB1 on the basis of the retrieved identification code and to retrieve and output the personal identity assigned to the identification code from the first database DB1.

Accordingly, this method and the use of two independent databases increase the distance between the biometric feature and the person's identity.

An institution that seeks to issue proof of identity (e.g., ID card, user card, ticket, flight ticket, etc.) can assign an identification code to each person. Through this alone, the person receives all access rights. The vein pattern recognition system described above can also record a graphical representation of the corresponding identification code and identify a person based on said graphical representation.

The camera chip C2, which is sensitive to visible light and which is preferably used, (or, alternatively, an infrared-sensitive camera chip) is able to record a printed graphical representation of the identification code, for example a QR code, on paper or another material, but also from an electronic display (smartphone, tablet or similar).

In this case, as well, it is possible to record from the graphical representation of the identification code both a photographic image under visible light (by means of the second camera chip C2 and/or the corresponding sensor cells for visible light of a single camera chip) and an infrared image (by means of the first camera chip C1 and/or the corresponding infrared-sensitive sensor cells of a single camera chip). In this case, the signature of the image signals in the infrared image and in the light image differs. The difference is, inter alia, determined by the materiality. It is possible to identify whether the present image shows a hand (skin), paper or a display. The printed graphical representation of the identification code may also be printed in different colors. A part of the graphical representation of the identification code may, for example, be printed in a broadband absorbing color such as carbon black, while another part of the graphical representation of the identification code is printed in a color that reflects infrared light or is less strongly absorbing. Thus, a graphical representation of the identification code can be easily distinguished from a copy thereof by means of a comparison between the infrared image and the photographic image of the graphical representation of the identification code. Similar to what applies in case of the vein pattern, in this case as well, it is an indication that a fake is present, if the infrared image and the photographic image are identical.

In order to authenticate a person (or an object), the device described in connection with FIGS. 1 to 3 is connected to an authentication unit P3, that is configured to derive the identification code from a graphical representation of the identification code recorded by the sensor system 400 and to assign the identification code a feature vector (and/or the associated hash value) derived from the hand vein pattern. Subsequently, the feature vector (and/or hash value) derived from the hand vein pattern and the graphical representation of the identification code stand opposite each other as synonymous.

By accessing the two databases DB1 and DB2, the authentication unit P3 can check whether a recorded vein pattern and a recorded graphical representation of an identification code belong to the same person and, if necessary, authenticate the corresponding person and output an authentication confirmation signal AUTH.

As indicated in FIG. 4, the authentication unit P3 may be part of the sensor system 400. The authentication unit P3 may, however, also be a processor unit that is physically independent of the sensor system and is only connected to the sensor system through signals.

The association between a person and a graphical representation of the identification code takes place independently and separately.

In the following, examples will be provided in order to describe how the sensor system may be designed and configured in order to authenticate a person based on their vein pattern and a graphical representation of the identification code:

Method 1: Authenticating a Registered Person

The sensor system is preferably configured to recognize whether a hand or a graphical representation of an identification code is present in its detection range. If the sensor system is presented with a bar code or QR code in its detection range, the sensor system will first of all check and recognize that what it is presented with is not a hand and therefore not a vein pattern. For purposes of the present disclosure, it is noted that the phrase "detection range" and "capture area" are equivalent.

Subsequently, the sensor system tests based on the photographic image whether what is present is a graphical representation of an identification code. If this is the case, a corresponding entry will be searched for in the first and the second database. If no suitable entry can be found, the sensor unit will generate an output signal AUTH.

If the corresponding entries are present, the sensor system will compare the hash value or feature vector assigned to the recognized identification code in the second database with the corresponding hash value or feature pattern of the hand vein pattern previously recognized as real. If the feature vector or hash value of the detected hand vein pattern corresponds to the feature vector or hash value assigned to the identification code in the second database, the sensor unit will generate an output signal AUTH and access can be granted to the person in question who has been authenticated in this manner.

Method 2: Registering a Person for Future Authentication

The following is an example describing how the sensor system may be designed and configured in order to register a person for authentication on the basis of their vein pattern.

First step: The sensor system is switched into registration mode. To this end, the sensor system has a switch, which can be operated for example by the user touching a symbol (e.g., REGISTER). If the symbol is touched (or almost touched), the sensor system switches into registration mode. The touching of the symbol is identified as a gesture that triggers the switch and switches the sensor system into registration mode. The sensor system has a high-resolution image recorder which is configured either as a 2D image recorder with a point projector or as a 3D TOF sensor and which is thus able to record and process a hand posture in 3D space.

A specific form of hand posture is identified. The approaching of the symbol (full touch is not required) is expected to be performed by an index finger. This gesture is recognized. The device is now in registration mode.

Second step: The user is requested to present the graphical representation of the identification code.

Third step: The presented graphical representation of the identification code is checked for its validity. The identification code represented by the graphical representation is searched for in the first database DB1.

If no corresponding entry is found, the process will be canceled.

If a valid entry is found, an entry with the associated identification code will be created in a second database DB2.

Fourth step: The user is asked to show their hand. The vein pattern of the hand is captured with a sensor unit 100 according to FIG. 2 or a sensor unit 200 according to FIG. 3 and it is checked whether the vein pattern is real. If the vein pattern is real, the processor unit P1 will calculate a feature vector and the calculated feature vector (or a corresponding hash value) will be assigned to the identification code in the second database DB2.

Fifth step: Via a central database platform, the second database is matched to other devices available in a connected access system at predetermined intervals (e.g., every 15 minutes). Consequently, the user can identify themselves at each of the devices connected in the system with their vein pattern. The user may securely store the bar or QR code. A loss of the bar or QR code does not lead to an identification of the person. Each person can register again and again with a new bar or QR code and/or register multiple times.

In a preferred embodiment, the security system is configured in such a way that entries in the second database which are not used for a certain time will be automatically deleted.

The invention claimed is:

1. A sensor system for a security system, comprising:
an authentication unit; and
a first database that is independent of a second database, wherein, in the first database, a personal identity is linked to an identification code and, in the second database, the identification code is linked to a vein pattern or feature vector generated from biometric data captured by the sensor system, in particular to a hash value derived therefrom, and
wherein the authentication unit is configured to determine the vein pattern or feature vector, in particular the hash value derived therefrom, on the basis of the biometric data captured by the sensor system, and to access the second database on the basis of the vein pattern or feature vector determined in that manner, in particular on the basis of the hash value derived therefrom, in order to retrieve or output the identification code assigned to the respective vein pattern or feature vector, in particular to the hash value derived therefrom,
wherein the sensor system is configured to capture a vein pattern and to verify that the captured vein pattern is a real vein pattern, wherein the sensor system further comprises:
a first light source for illuminating a capture area across the entire surface, the first light source configured to emit electromagnetic waves during operation that have wavelengths in the near infrared range which are absorbed by hemoglobin;
a second light source for illuminating the capture area across the entire surface, the second light source configured to emit electromagnetic waves during operation with at least one non-infrared wavelength, in particular in the range of visible light
a camera for reproducing the capture area:
on a first camera chip with first sensor cells which are configured to record reflected electromagnetic waves with wavelengths in the near infrared range and to output signals representing a corresponding infrared image; and
on a second camera chip with second sensor cells or second sensor cells of the first camera chip, which are configured to record reflected electromagnetic waves with the at least one non-infrared wavelength and to output signals representing a corresponding photographic image; and
a first processor unit which is connected to at least one of the first camera chip and the second camera chip, and which is configured to compare the photographic image with the infrared image to determine the degree of matching between the photographic image and the infrared image, the first processor unit operable to:
classify the vein pattern as real if the degree of matching is less than a predetermined degree of matching; and
classify the vein pattern as not real if the degree of matching is greater than or equal to the predetermined degree of matching.

2. The sensor system according to claim 1, wherein in order to be able to compare the infrared image and the photographic image, the first processor unit is configured to execute a differential image method or a comparison between the information content of the infrared image and the information content of the photographic image, or a comparison based on selected points of the infrared image and the photographic image.

3. The sensor system according to claim 1,
wherein the first and second light sources are configured in the form of a single broadband light source with a first filter and a second filter, and
wherein the first filter is configured to allow only electromagnetic waves with wavelengths in the near infrared range to pass and the second filter is configured to allow only electromagnetic waves with wavelengths in the range of visible light to pass.

4. The sensor system according to claim 1, wherein the first and the second camera chips or a single combined camera chip are synchronized with the respective light source in such a way that light falling on their sensor cells will only be captured after a predetermined delay time after the emission of a light pulse from the respective light source.

5. The sensor system according to claim 1, wherein the first processor unit is further configured to cause a warning signal to be output if the vein pattern is classified as not real.

6. The sensor system according to claim 1, further comprising a release unit connected to the sensor system which is configured to initiate an authentication process if the vein pattern is classified as real.

7. The sensor system according to claim 6, wherein the first processor unit is further configured to carry out the authentication process by performing image preprocessing of the infrared image, feature extraction and a classification where the vein pattern is, based on a pattern specification, classified as sufficiently matching or not sufficiently matching.

8. The sensor system according to claim 6, wherein the first processor unit is further configured to compare the infrared image with at least one stored vein pattern or a stored feature vector corresponding to the vein pattern if the vein pattern is classified as real, and to classify the vein pattern classified as real, depending on a degree of matching, as sufficiently matching or not sufficiently matching, and
wherein the release unit is additionally configured to allow access to a downstream system if the vein pattern is classified as sufficiently matching.

9. The sensor system according to claim 6, further comprising:
a topography sensor for capturing three-dimensional topography data; and
a second processor unit connected to the first processor unit and the topography sensor and which is configured to generate, during operation, a standardized vein pattern of a hand or a feature vector corresponding to the vein pattern from the infrared image obtained under illumination from the first light source and the three-dimensional topography data of the topography sensor,
wherein the first processor unit is additionally configured to compare the generated standardized vein pattern or the generated feature vector with at least one stored vein pattern or with at least one stored feature vector and to classify the generated standardized vein pattern or the generated feature vector as sufficiently matching or not sufficiently matching, and
wherein the release unit is additionally configured to allow access to a downstream system if the generated standardized vein pattern or the generated feature vector is classified as sufficiently matching.

10. A method for checking a vein pattern, comprising:
presenting a hand to a security system comprising a first database that is independent of a second database, wherein:
in the first database, a personal identity is linked to an identification code; and
in the second database, the identification code is linked to a vein pattern or feature vector generated from biometric data captured by the sensor system, in particular to a hash value derived therefrom;
recording an infrared image and a photographic image of the hand by:
irradiating a full surface of the hand or a part of the hand with electromagnetic waves with wavelengths in the near infrared range which are absorbed by hemoglobin;
recording reflected electromagnetic waves with wavelengths in the near infrared range and converting them into the infrared image;
irradiating the full-surface of the hand or the part of the hand with electromagnetic waves with at least one non-infrared wavelength, in particular in the range of visible light;
recording reflected electromagnetic waves with the at least one non-infrared wavelength and converting them into the photographic image;
comparing the photographic image with the infrared image;
determining a degree of matching between the photographic image and the infrared image;
classifying the vein pattern as real if the degree of matching is less than a predetermined degree of matching and as not real if the degree of matching is greater than or equal to the predetermined degree of matching;
determining a vein pattern or a feature vector, in particular a hash value derived therefrom, on the basis of the infrared image; and
accessing the second database on the basis of the determined vein pattern or feature vector, in particular on the basis of the hash value derived therefrom, in order to retrieve or output an identification code assigned to the respective vein pattern or feature vector, in particular to the hash value derived therefrom.

11. The method according to claim 10, wherein further processes will be unblocked after the vein pattern has been classified as real.

12. The method according to claim 11, wherein the further processes comprise:
recording topography data of the hand; and
generating a standardized vein pattern of the hand or a feature vector corresponding to the vein pattern from the infrared image and the topography data.

13. The method according to claim 12, further comprising:
performing a comparison of the generated standardized vein pattern or the generated feature vector with at least one stored vein pattern or feature vector; and
classifying the generated standardized vein pattern or the generated feature vector as sufficiently matching or not sufficiently matching.

14. The method according to claim 13, wherein additional processes will be unblocked after the generated standardized vein pattern or the generated feature vector has been classified as sufficiently matching.

15. The method according to claim 10, wherein a graphical representation of an identification code assigned to a person is recorded and the identification code is assigned to the determined vein pattern or feature vector, in particular to the hash value derived from the feature vector.

* * * * *